Aug. 14, 1951            J. S. MADDIC            2,564,016
FISHING ROD WINDING MECHANISM
Filed Oct. 11, 1949            2 Sheets-Sheet 1
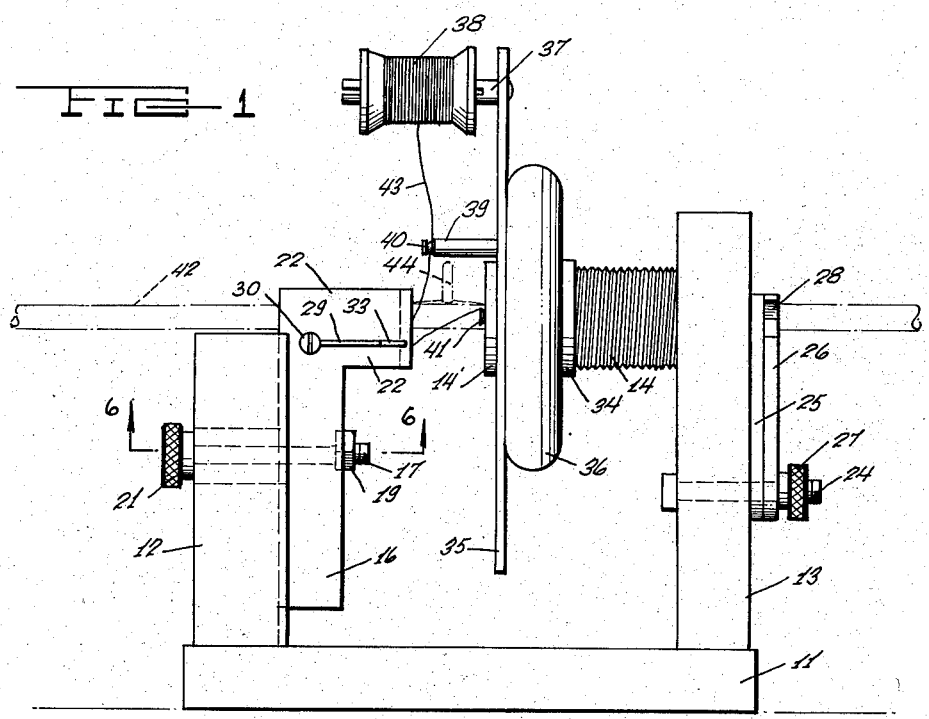
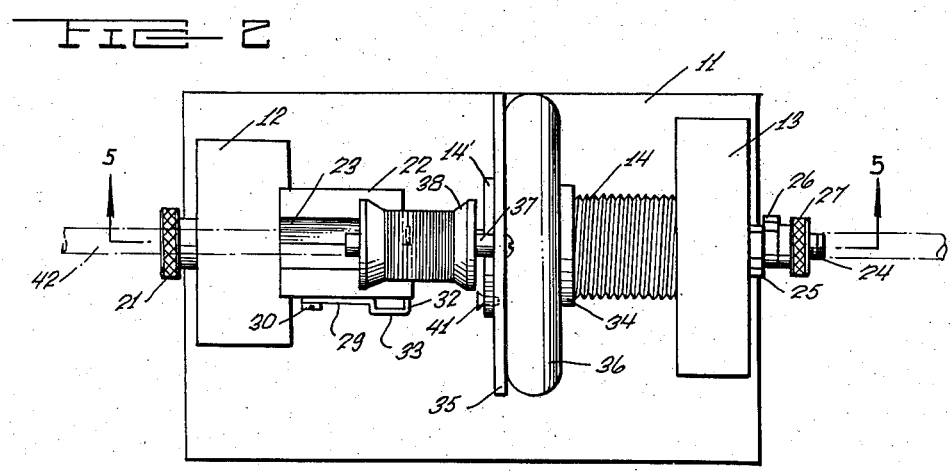
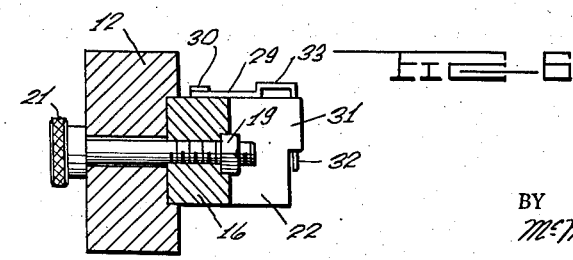
INVENTOR
JOHN S. MADDIC
BY
McMorrow, Berman + Davidson
ATTORNEYS

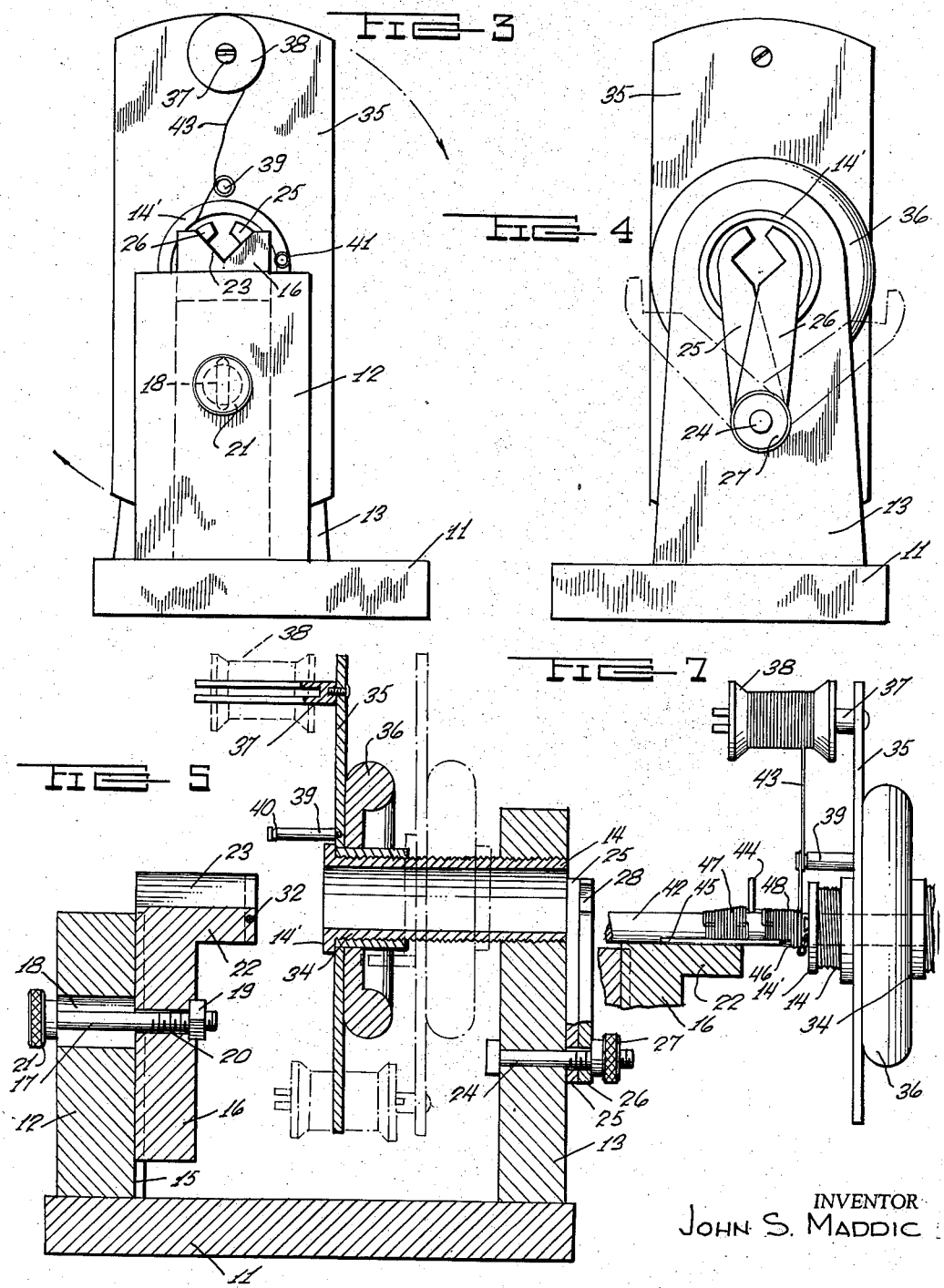

Patented Aug. 14, 1951

2,564,016

UNITED STATES PATENT OFFICE 2,564,016

FISHING ROD WINDING MECHANISM

John S. Maddic, Bristol, Conn.

Application October 11, 1949, Serial No. 120,651

6 Claims. (Cl. 242—7)

This invention relates to winding devices, and more particularly to a device for accurately applying winding threads to desired areas of fishing rods, for example, for winding thread for holding guide members on the rods.

A main object of the invention is to provide a novel and improved thread-wrapping mechanism for fishing rods which is very simple in construction, which is easy to operate, and which evenly spaces the thread around the rod as it is wound.

A further object of the invention is to provide an improved thread-winding mechanism for wrapping thread around fishing rods to secure guides on said rods, said mechanism being inexpensive to construct, providing uniform tension on the thread as it is wound, providing accurate spacing of the turns of the thread, and providing means for covering up the ends of the thread wound on the fishing rod.

Further objects and advantages of the invention will become apparent from the following description and claims, and from the accompanying drawings, wherein:

Figure 1 is a side elevational view of a thread-winding mechanism constructed in accordance with the present invention;

Figure 2 is a top plan view of the mechanism of Figure 1;

Figure 3 is an end elevational view of the mechanism of Figure 1 taken from the left end thereof, as seen in Figure 1;

Figure 4 is an end elevational view of the mechanism taken from the right end thereof, as seen in Figure 1;

Figure 5 is a vertical longitudinal cross-sectional view taken on line 5—5 of Figure 2;

Figure 6 is a cross-sectional detail view taken on line 6—6 of Figure 1;

Figure 7 is a fragmentary elevational detail view, partly in cross-section, showing the relative positions of the parts of the mechanism at the conclusion of the thread-winding process.

Referring to the drawings, 11 designates a generally rectangular base having secured to one end thereof a vertical upstanding block member 12 and having secured to the other end thereof another vertical upstanding block member 13. Designated at 14 is a longitudinally-extending, horizontal, externally-threaded, tubular sleeve which is rigidly secured in the top portion of block member 13. The block member 12 is formed on its inner surface with a vertical groove 15. Slidably fitting groove 15 is a block member 16 which is adjustably clamped to block member 12 by a bolt 17 extending through a vertical slot 18 formed in block member 12 and threaded into a square nut 19 seated in a square recess formed at the inner end of a transverse bore 20 in block member 16, the bolt 17 extending through the bore 20, as shown in Figure 5. Bolt 17 is provided with a knurled head 21 for loosening and tightening the bolt when it is desired to adjust the height of the block member 16.

Block member 16 is formed with an enlarged head 22, said head being formed at its top with a longitudinally-extending V-groove 23 which may be aligned with the tubular sleeve 14 by adjusting the elevation of block member 16.

Extending through block member 13 below sleeve 14 is a bolt 24. Mounted on bolt 24 outwardly adjacent block member 13 and rotatable thereon are the respective clamping arms 25 and 26, the bolt 24 being provided with a knurled clamping nut 27 for locking the arms 25 and 26 in clamping positions. The upper portions of arms 25 and 26 are formed with opposing, inwardly-facing, V-shaped notches 28 which are adapted to clampingly engage a fishing rod positioned so as to extend through sleeve 14, as will be presently described.

Designated at 29 is a resilient wire hook member secured at one end to a side surface of head 22, as by a machine screw 30 engaging in an eye formed at the end of the hook member. The head 22 is formed with an abutment 31 formed with a horizontal transverse bore through which the free end of the hook member projects, as shown at 32. Hook member 29 is formed adjacent the side surface of head 22 with an outwardly-projecting loop 33, enabling the free end 32 of the hook to be manually retracted through the abutment 31 sufficiently to release a thread from engagement between the end 32 and the head 22, as will be presently described.

Threadedly engaged on sleeve 14 is a collar member 34 on which is secured a plate member 35 and a hand wheel 36. Secured to the outer portion of plate member 35 is a horizontal slotted pin 37 upon which a spool 38 is adapted to be mounted, the slot in the pin providing a spring-gripping action on the bore of the spool and retarding rotation of said spool, whereby tension on the spool is provided as the spool unwinds. Secured to the plate member 35 adjacent collar 34 is a horizontal stud 39 formed with a peripheral guide notch 40 adjacent its free end. Secured to a stop flange 14' formed at the end of sleeve 14 is a headed pin member 41.

In using the device, the fishing rod, shown at 42, is mounted in the sleeve 14 and is supported on one side of the sleeve in the V-groove 23 and on the other side in the opposing V-notches 28 of the arms 25 and 26, said arms being secured in film clamping engagement with the rod 42 by tightening the clamping nut 27. The spool 38 is mounted on the pin 37. The thread, shown at 43 is wound once around the guide groove 40, engaged between the free end of the arm 32 of hook 29 and the forward surface of head 22 and is tied to the headed pin member 41. The hand wheel 36 is then rotated a few turns, advancing collar 34 on sleeve 14, the rod 42 being meanwhile held down in V-groove by the operator with one finger. This wraps a few turns of thread around the rod 42 overlying the end portion of the thread adjacent member 32 and locks said portion to the fishing rod. The guide member to be secured to the rod is shown in dotted view at 44 and is held so that the first few turns of thread encircle the base postion of the guide member as well as the fishing rod.

After the first few turns have been made, as above described, the loop 33 is pulled outwardly, releasing the thread from engagement with head 22. The portion of the thread secured to pin 41 is then pulled to tighten same and said portion is then cut close to the fishing rod. Rotation of hand wheel 36 is then resumed until almost the desired number of turns of thread have been made on the rod.

Designated at 45 is a rod having a wire loop 46 secured to its end. The rod 45 is placed with the wire loop extending over the remaining portion of the rod to be encircled, and the final few turns of thread are then wound over loop 46 as well as over the rod. The thread is then cut, leaving a short end, and said short end is inserted in loop 46. Rod 45 is then retracted, pulling the short end of the thread under the final few turns. The exposed portion of the end of the thread is cut off after disengagement from loop 46, leaving both ends of the thread covered by the winding.

The thread may be wound over the rod 42 to cover the opposite base portion of the guide member 44 in the same manner as above described. The completed wrappings are shown at 47 and 48 in Figure 7, the tying rod 45 being shown in position to tie the end of the wrapping 48 in the manner previously described.

While a specific embodiment of a thread-winding apparatus, for securing guides and the like on fishing rods, has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rod-winding apparatus comprising a base, a pair of longitudinally-spaced upstanding supports secured on said base, a tubular externally-threaded sleeve secured in one of said supports, a collar member threadedly engaged on said sleeve, a plate member carried by said collar member, a pin secured to said plate member and extending parallel to said sleeve for supporting a thread spool, a hook element movably secured to the other support adjacent said sleeve for holding the free end of the thread, stop means carried by said sleeve, a pair of cooperative clamping jaws pivoted to the first-mentioned one of said supports, means for locking said jaws in fixed clamping positions, and means for vertically adjusting the other support.

2. A rod-winding apparatus comprising a base, a pair of longitudinally-spaced vertical supports secured on said base, a tubular externally-threaded sleeve longitudinally secured in one of said supports, a collar member threadingly engaged on said sleeve, a plate member carried by said collar member, a pin secured to said plate member and extending parallel to said sleeve for supporting a spool, a thread guide secured to said plate member between the pin and the collar member and extending parallel to the pin, a hook element movably secured to the other support adjacent said sleeve for holding the free end of the thread, a headed projection carried by said sleeve for limiting the rotative movement of the collar, a pair of cooperative clamping jaws pivoted to one of said supports, and means for locking said jaws in fixed clamping positions.

3. Means for wrapping strand on an article comprising a pair of spaced uprights, means for vertically adjusting one of said uprights, a tubular externally threaded sleeve longitudinally mounted in the other upright and receiving a work piece which rests on the top of the adjustable upright, a collar threadingly engaged on the sleeve, a plate radially projecting from the sleeve, a pin secured to said plate parallel to the sleeve for supporting a spool on which the strand is wound, a hook element secured to the adjustable upright below the supported article for holding the free end of the strand as the strand is wrapped around the article by rotation of the collar and stop means on said sleeve limiting the rotative movement of the collar on the sleeve.

4. Means for wrapping strand on an article comprising a pair of spaced uprights, means for vertically adjusting one of said uprights, a tubular externally threaded sleeve longitudinally mounted in the other upright and receiving a work piece which rests on the top of the adjustable upright, a collar threadingly engaged on the sleeve, a plate radially projecting from the sleeve, a pin secured to said plate parallel to the sleeve for supporting a spool on which the strand is wound, a hook element secured to said plate parallel to the sleeve for supporting a spool on which the strand is wound, a hook element secured to the adjustable upright below the supported article for holding the free end of the strand as the strand is wrapped around the article by rotation of the collar and stop means on said sleeve limiting the rotative movement of the collar on the sleeve, a pair of cooperative clamping jaws pivotally mounted on one of the uprights for vertical swinging movement relative to the article and means for locking the jaws in fixed clamping engagement of the article.

5. Means for wrapping strand on an article comprising a first upright and a spaced second upright, a vertically adjustable holder on said first upright for supporting on its upper end an article to be encompassed with the strand, a tubular externally threaded sleeve longitudinally mounted in the second upright and receiving the article, a collar threadingly engaged on the sleeve, stop means for limiting the rotative movement of the collar on the sleeve, a plate radially projecting from the collar, a pin laterally projecting from the plate parallel to the sleeve for supporting a spool on which the strand is wound, a guide on said plate parallel to the pin and means formed on the first upright for holding the free end of the strand as the collar is rotated to move the spool around the article.

6. Means for wrapping strand on an article comprising a first upright and a spaced second upright, a vertically adjustable holder on said first upright for supporting on its upper end an article to be encompassed with the strand, a tubular externally threaded sleeve longitudinally mounted in the second upright and receiving the article, a collar threadingly engaged on the sleeve, stop means for limiting the rotative movement of the collar on the sleeve, a plate radially projecting from the collar, a pin laterally projecting from the plate parallel to the sleeve for supporting a spool on which the strand is wound, a guide on said plate parallel to the pin and means formed on the first upright for holding the free end of the strand as the collar is rotated to move the spool around the article, and means for clamping the article against axial and rotative movement, said last means including a pair of cooperative jaws pivotally mounted on the second upright for vertical swinging movement relative to the article and means associated with the pivot for the jaws for locking the jaws in clamping engagement of the article.

JOHN S. MADDIC.

REFERENCES CITED

The following references are of record in the file of this patent:

UNITED STATES PATENTS

| Number | Name | Date |
| --- | --- | --- |
| 2,427,079 | Werth | Sept. 9, 1947 |
| 2,460,478 | Warner | Feb. 1, 1949 |